(12) United States Patent
Schober et al.

(10) Patent No.: US 8,289,718 B2
(45) Date of Patent: Oct. 16, 2012

(54) CONNECTOR ASSEMBLY FOR ELECTRICAL AND MECHANICAL INTERCONNECTION OF MODULES

(75) Inventors: Thomas Schober, Hahnback/Iber (DE); Werner Beck, Amberg (DE); Thomas Deichler, Sulzbach-Rosenberg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 228 days.

(21) Appl. No.: 12/915,245

(22) Filed: Oct. 29, 2010

(65) Prior Publication Data

US 2012/0106096 A1 May 3, 2012

(51) Int. Cl.
*H05K 1/00* (2006.01)
*H05K 1/18* (2006.01)
*H05K 7/00* (2006.01)

(52) U.S. Cl. ........................................ 361/748; 174/250

(58) Field of Classification Search .................. 361/748, 361/807, 810; 174/250, 255; 439/79, 65, 439/608

See application file for complete search history.

(56) References Cited

U.S. PATENT DOCUMENTS

| 5,009,128 | A | * | 4/1991 | Seidel et al. | 477/122 |
| 5,311,408 | A | * | 5/1994 | Ferchau et al. | 361/818 |
| 6,773,272 | B2 | * | 8/2004 | Koehler et al. | 439/79 |
| 6,918,315 | B2 | * | 7/2005 | Noeth et al. | 74/335 |
| 7,973,516 | B2 | * | 7/2011 | Flack | 320/137 |
| 2003/0214492 | A1 | | 11/2003 | Noeth et al. | |

FOREIGN PATENT DOCUMENTS

DE 102 11 968 A1 3/2002
EP 0 995 931 B2 11/2004

* cited by examiner

*Primary Examiner* — Yuriy Semenenko
(74) *Attorney, Agent, or Firm* — Davis & Bujold, PLLC

(57) ABSTRACT

A connector for electrical and mechanical interconnection of first and second mechanically adjacent modules with one another. The first module includes a first electrical connector and an alignment pin and the second module includes a printed circuit board floatingly and displacably mounted on the second module with at least one alignment hole aligned for alignment with the alignment pin of the first module and a second electrical connector aligned for engagement with a corresponding first electrical connector of the first module. During assembly, the alignment pin of the first module engages the alignment hole of the second module and displaces the printed circuit board to align the second electrical connector with the first electrical connector.

10 Claims, 6 Drawing Sheets

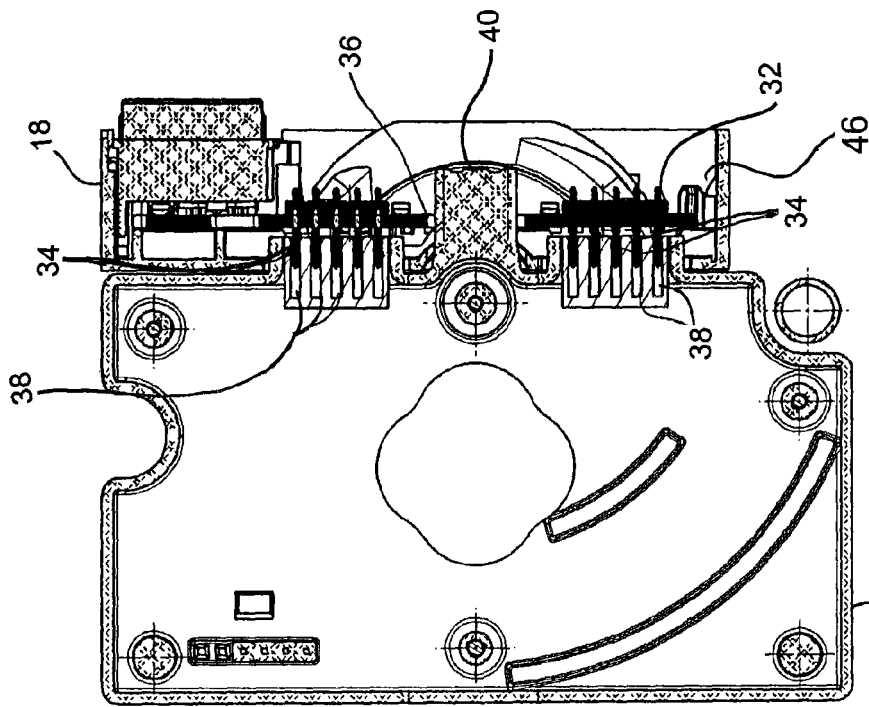
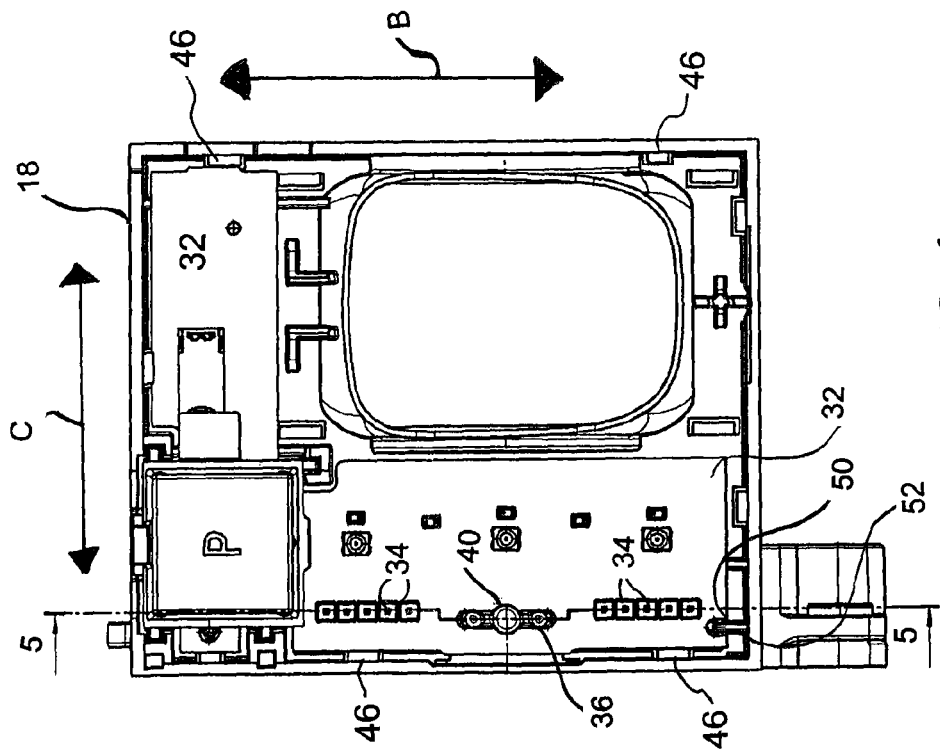

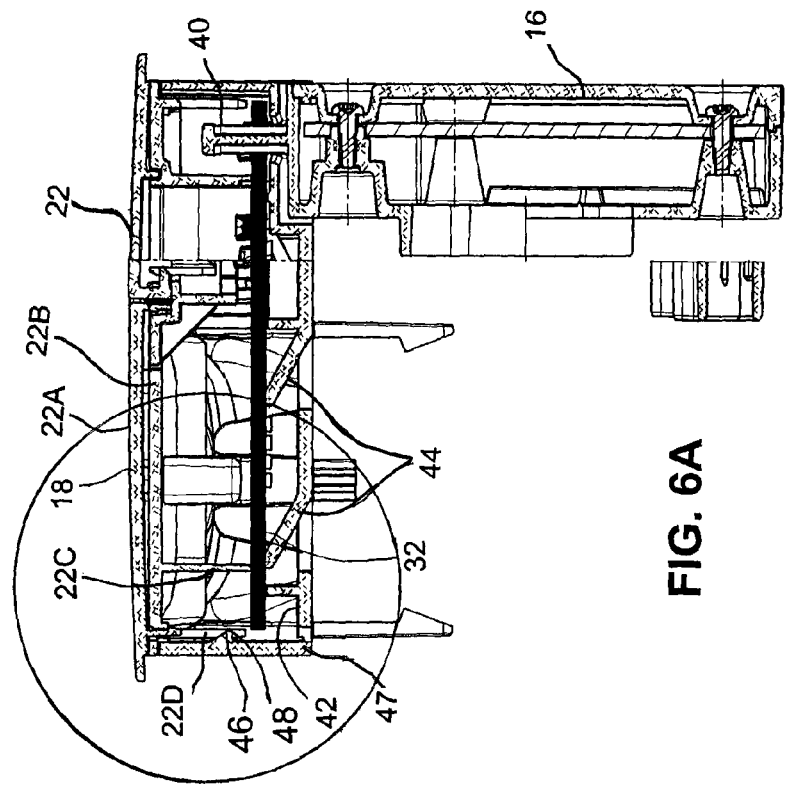
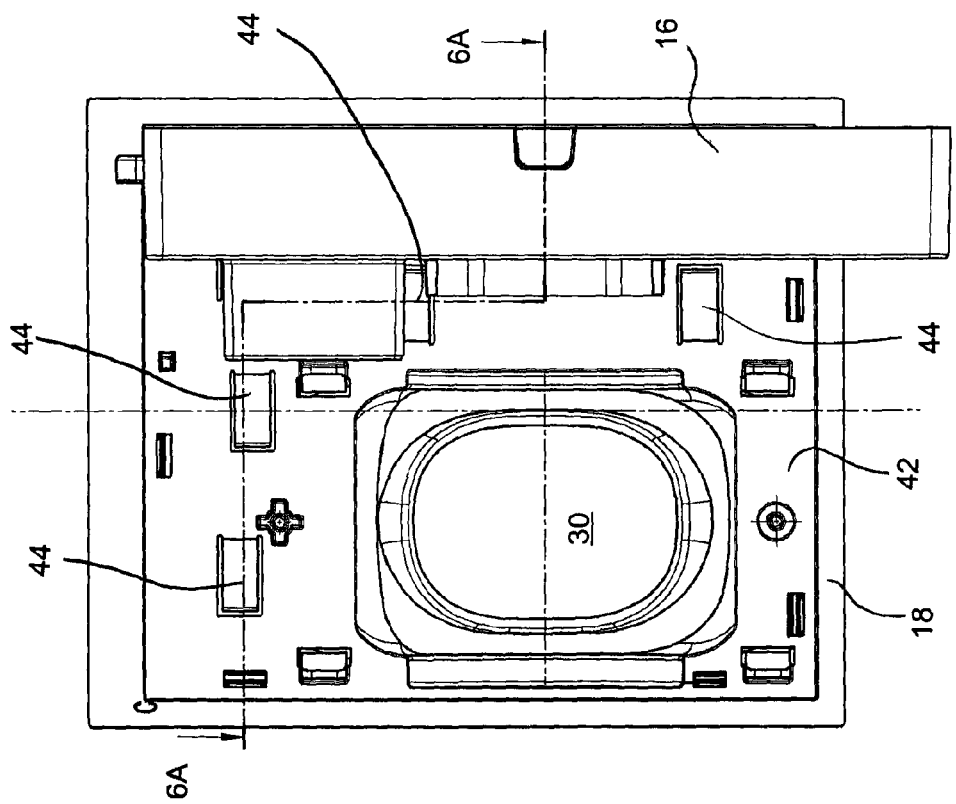
FIG. 6A
FIG. 6

CONNECTOR ASSEMBLY FOR ELECTRICAL AND MECHANICAL INTERCONNECTION OF MODULES

FIELD OF THE INVENTION

The present invention relates to a connector assembly for assisting with mechanical and electrical interconnection of adjacent modules with one another and, in particular, for the electrical interconnection of a display module with a mechanically adjacent control module.

BACKGROUND OF THE INVENTION

Many electrical and mechanical systems are constructed on a module basis. That is, related functions or groups of related functions of a system are implemented in separate modules which are then electrically and/or mechanically interconnected with one another so as to cooperate in performing the various functions and operations of the system.

An example of such is a transmission system for a motor vehicle in which the system may include a transmission control module and a transmission display module. In such systems, the transmission control module is typically responsive to driver inputs for selecting gear change operations of the vehicle by, for example, a shift lever, and possibly in response to inputs from other modules of the vehicle indicating parameters such as the vehicle speed and the gas pedal inclination and/or movement, and generating corresponding electrical/electronic, hydraulic and/or mechanical control outputs in response to the same to assist with controlling the vehicle transmission. In many systems, the control module is a program controlled processor based system which can control a desired array of transmissions by corresponding variations in the computer program incorporated within the control module.

The transmission display module, in turn, may include a general purpose display panel, such as a liquid crystal display panel or a light emitting diode screen, which receives display control outputs from the control module indicating, for example, the transmission shift pattern for the specific transmission installed within the vehicle, transmission operations and status such as a currently engaged gear or gear ratio, a brake status, and/or vehicle operating status indications, such as engine speed, temperature, oil pressure, etc. The use of a general purpose display with the specific display symbols and elements display thereon being controlled by programs in the transmission control module again allows a single display module to be used in conjunction with a fairly wide array of possible transmissions and readily tailored to the individual transmission by corresponding alterations/variations in the transmission control module programs. In many instances, the display panel may be mounted in association with the driver input controls to the transmission control module with, for example, the transmission shift lever extending through an opening in the display panel that corresponds to a generic shift pattern for the various transmissions that may be installed in the vehicle.

A recurring problem with such modular systems, however, arises from the need to electrically and/or electronically interconnect the various modules of the vehicle systems with one another, which typically requires various forms of vehicle interconnection buses, module-to-module buses and/or wiring harnesses and connectors. Such interconnections typically require the interconnection of wiring harnesses, cables, buses and/or connectors which, in turn, result in increases system costs and complexity and generally reduces the connection reliability due to the possibly failure of the interconnection components, such as cables and connectors, in adverse environments, such as in a vehicle.

It is generally recognized that the need for wiring harnesses, cables, buses and/or connectors for connecting some components together cannot be avoided in certain situations, such as in the case of modules that are physically separated from one another, but it is advantageous if physically adjacent modules could be directly interconnected with one another, thereby eliminating the need to have additional wiring harnesses, buses and/or connectors for forming the associated connection(s) between such mechanically adjacent modules.

The prior art has made various attempts at providing a mechanism for directly electrically and electronically interconnecting mechanically adjacent modules of a system with one another, all of which have suffered from one or more significant problems and/or drawbacks. For example, mechanically adjacent modules of a system, including electrically and electronically interconnected modules, are also typically constructed also be mechanically interconnected, such as by having mating parts or casing that interlock in one manner or another, or by mechanical connectors such as bolts, screws, etc.

A recurring problem with the direct electrical interconnection of such mechanically interconnected modules by, for example, directly mating electrical connectors mounted on the modules arises, however, from the tolerances or "play" necessary and inherent for joining mechanical components with one another and, in particular, the potential ranges of cumulative tolerances of the connected modules. That is, all mechanical components which interconnect with one another inherently have a range of tolerances and when assembling modules with one another and/or with other components, the tolerances of the various components can be cumulative thereby rendering it more difficult to accurately and reliably assemble components, such system modules, with one another. The cumulative total tolerance(s), of the components within a given assembly, may be significantly greater than the tolerance ranges of the individual components of the modules, and thereby possibly prevent the correct mechanical mating connection of two modules with one another. In the case of electrical or electronic connections between adjacent modules, the component tolerances, including the cumulative tolerances on the mechanical mating elements of two modules and their cumulative tolerances for the electrically or electronically mating elements, such as electrical connectors of various types, may individually or in combination with one another prevent an adequate electrical connection of the electrical connectors of the two modules with one another or may possibly result in damage to the electrical connections when such connection is attempted.

Certain prior systems, such as described in EP 0 995 931 B2 and DE 102 11 968.6 (corresponding U.S. Patent Publication No. 2003/0214492 A1), for example, have attempted to solve the problems of electrical interconnections between adjacent modules by, for example, the use of flexible connections, such as cables, flexible buses, and wiring harnesses mating with connectors on one or both modules, as discussed above. Other systems of the prior art have, for example, imposed restrictions on the mechanical tolerances of and between components so that the cumulative tolerances of the components fall within an acceptable range of tolerance(s). This procedure, however, requires significantly higher precision, during the manufacturing process of the mechanical components, and thus raises the associated costs of the various components, which is generally to be avoided.

The present invention provides a solution to the above noted problems, as well as other related problems associated with the prior art systems.

SUMMARY OF THE INVENTION

The present invention is directed to a connector assembly for electrical and mechanical interconnection of first and second mechanically adjacent modules with one another. The first module includes at least one first electrical connector mounted therein and aligned along a connection axis between the first module and second modules and at least one alignment pin aligned along the connection axis between the first and second modules. The second module includes a printed circuit board floatingly mounted to the second module so as to be displaceable along at least one orthogonal axis, orthogonal to the connection axis. The printed circuit board includes at least one alignment hole aligned to be engaged with a corresponding one of the at least one alignment pin of the first module. The second module further includes at least one second electrical connector aligned to be engaged with a corresponding one of the at least one first electrical connector of the first module. According to the present invention, when the first and second modules are brought into mechanical connection with each other along the connection axis, the at least one alignment pin of the first module engages the corresponding at least one alignment hole of the second module and displaces the printed circuit board of the second module orthogonally to the connection axis to properly align the at least one second electrical connector with a corresponding one of the at least one first electrical connector of the first module.

In a present embodiment of the invention, the first module is a transmission control module and the second module is a transmission display module. In this embodiment, the transmission display module includes a display panel connected with the printed circuit board, the display panel being responsive to display control outputs of the printed circuit board to programmably display information relating to operation of a transmission, including at least a transmission shift pattern and current transmission gear ratio.

BRIEF DESCRIPTION OF THE DRAWINGS

The invention will now be described, by way of example, with reference to the accompanying drawings in which:

FIG. 4 is top plan view of showing the display module mechanically and electrically interconnected with the control module, prior to installation of the display panel;

FIG. 5 is a cross sectional view, along section line 5-5 of FIG. 4, showing the interconnection of the display module to the control module;

FIG. 6 is bottom plan view of showing the display module mechanically and electrically interconnected with the control module;

FIG. 6A is a cross sectional view along section line 6A-6A of FIG. 6 showing springs for biasing the circuit board away from a base of the transmission display module and the mating splines for permitting the circuit board to float;

DETAILED DESCRIPTION OF THE INVENTION

The following describes the connection system, according to the present invention, for electrical and mechanical interconnection of adjacent first and second modules with one another. In this embodiment, the exemplary connection system comprises a transmission control module which is mechanically and electrically interconnected with the adjacent transmission display module.

Figure 1:
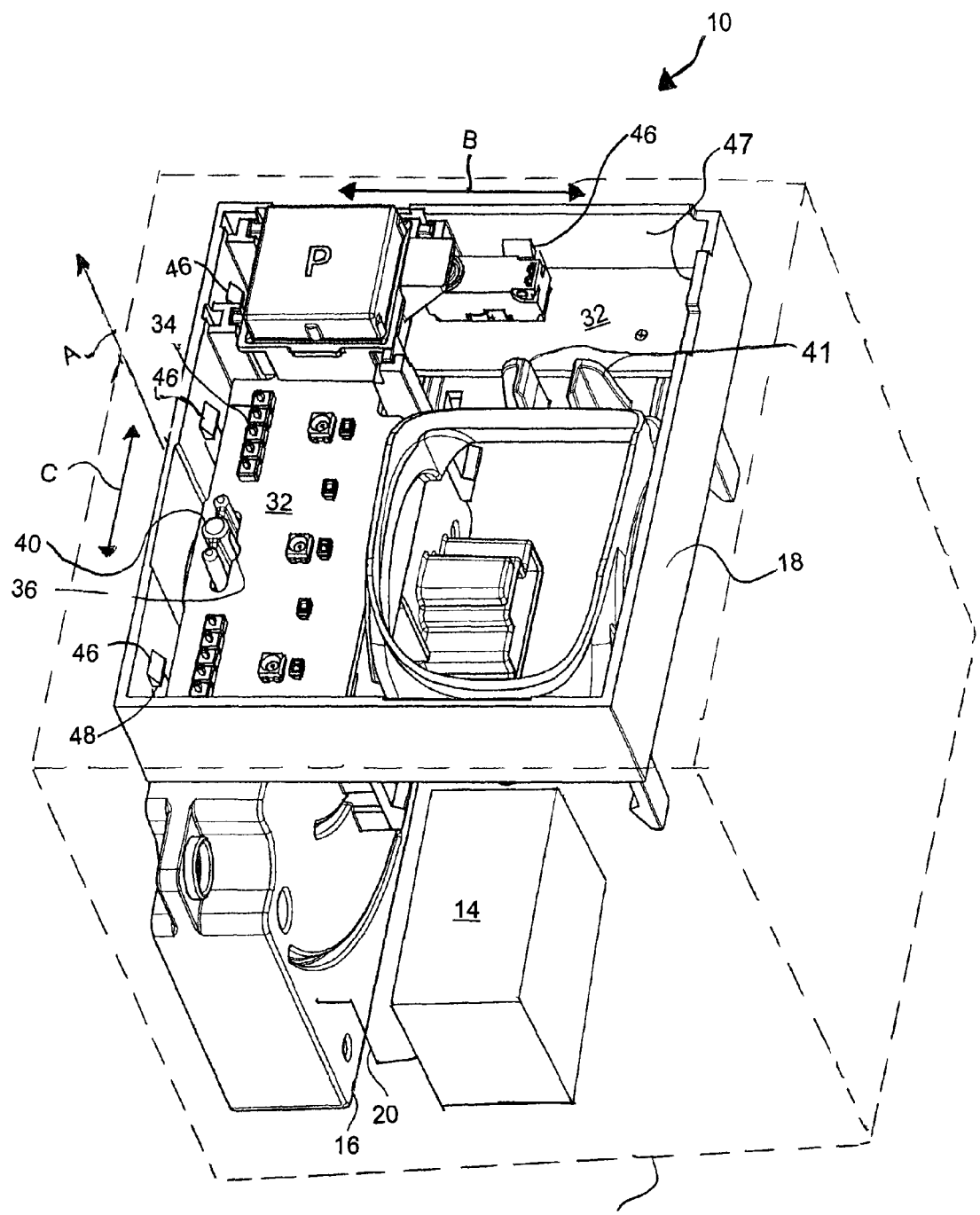
FIG. 1 is an isometric top view of a control module mechanically and electrically interconnected with a display module, prior to installation of the display panel.
Figure 2:
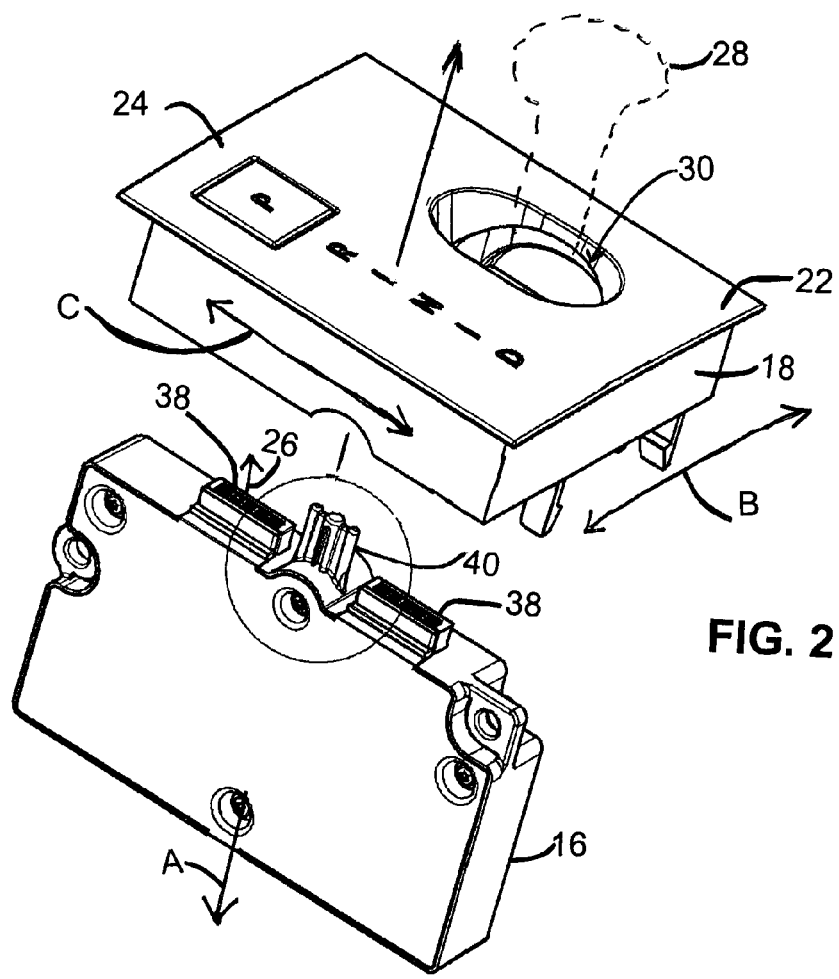
FIG. 2 is a top assembly isometric view of a control module mechanically and electrically interconnected with a display module.
Figure 2A:
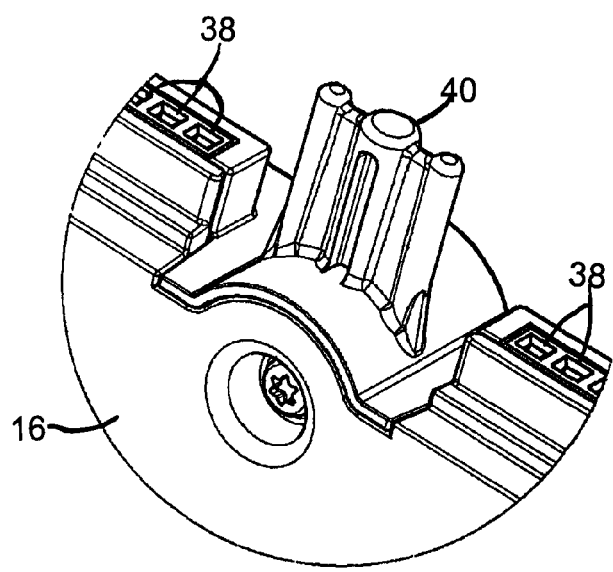
FIG. 2A is an exploded isometric view of the pin and connectors of the transmission control module for FIG. 2.

With reference to FIG. 1, a module assembly 10 for a system, such as a transmission control and display system 12 for a transmission 14 of a vehicle, is shown in which a transmission control module 16 is mechanically and electrically interconnected with a transmission display module 18. As generally shown in FIGS. 1, 2, 2A, 3 and 4, the transmission control module 16 is typically responsive to a driver input for selecting a gear change operation(s) for the vehicle by, for example, a shift lever 28 (see FIG. 2), and possibly in response to one or more other inputs received from other modules of the vehicle indicating vehicle operating parameters such as the vehicle speed and/or the gas pedal position/movement, and generating corresponding electrical/electronic, hydraulic and/or mechanical control outputs 20 (only diagrammatically shown in FIG. 1) for controlling the vehicle transmission. The transmission control module 16 may be, for example, a program controlled processor based system which can be implemented with a fairly wide range of transmissions 14 by corresponding alterations, variations or modifications of the computer program(s) operating within and controlling the transmission control module 16.

The transmission display module 18, in turn, is controlled by display control outputs 26 (only diagrammatically shown in FIG. 2) generated by the transmission control module 16 and may include a program controlled processor which is controlled by the display control outputs. The transmission display module 18 includes an exterior display panel cover 22 which supports a general purpose display panel 24, such as a liquid crystal display panel or a light emitting diode screen, electrically coupled with and controlled by transmission display module 18 in response to the display control outputs 26 received from the transmission control module 16, and possible control inputs received from other modules indicating, for example, a brake status or vehicle operating status indications, such as engine speed, engine temperature, engine oil pressure, etc. The display shown on the display panel 24 will typically include, for example, the transmission shift pattern for the specific transmission 14 installed within the vehicle, transmission operations and status such as the currently engaged gear and/or gear ratio, the brake status, and/or vehicle operating status indications, such as engine speed, temperature and oil pressure. As discussed, the driver transmission input control, such as a transmission shift lever 28, may be mounted in close proximity to the display panel 24 and the transmission display module 18 with, for example, the transmission shift lever 28 passing through a transmission shift pattern opening 30 formed within the display panel cover 22 carrying the display panel 24. The other end of the transmission shift lever 28 is connected or coupled to the transmission in a conventional manner. The display panel cover 22 includes an outer housing 22A and an inner housing 22B that are fixedly secured to one another in a conventional manner. The display panel cover 22 is secured to the transmission display module 18 by a plurality of "U" shaped elements 22D which are integral with a bottom surface of the display panel cover 22 and mate with corresponding retaining clips 46 of the transmission display module 18, and a further detail discussion concerning the same will follow below.

As discussed, the use of a general purpose display panel 24 with the specific display symbols and feature displayed thereon is controlled by at least one program contained within transmission control module 16, and possibly also one or more programs residing in the transmission display module 18. This flexibility allows a single transmission display module 18 to be used in conjunction with a wide array or range of possible transmissions 14 and easily tailored to suit the specific transmission 14 installed within the vehicle by corresponding modifications and/or variations in the computer program(s) installed within the transmission control module 16.

Referring now to FIGS. 1, 2, 2A, 3, 4 and 5 and briefly considering the primary problem addressed by the present invention in providing an aligning mechanism by which a first system module, such as a transmission control module 16, may be directly electrically connected with a second system module, such as a transmission display module 18, to which the first system module is mounted. As indicated therein, the transmission display module 18 is electrically and mechanically mounted to the transmission control module 16 by relative movement of those two modules 16, 18 along a connection axis A (see FIGS. 1, 2 and 3). The corresponding interconnecting mechanical elements of the transmission control module 16 and the transmission display module 18 as well as the associated electrical connectors 34, 38 are accordingly oriented and aligned with one another so as to properly mate with one another when the transmission control module 16 and the transmission display module 18 are brought into full engagement with one another by relative movement of the two modules 16, 18 toward one another along the connection axis A.

As generally indicated in FIGS. 1 and 4, the mechanical tolerances of and between the component comprising both the transmission display module 18 and the transmission control module 16 are such that one or more of the components of the transmission display module 18 may be mechanically displaced with respect to a remainder of the transmission display module 18 along either, or both, of the lateral orthogonal axes B and C, each of which lie in a common plane and extends orthogonal to the connection axis A as well as orthogonal to one another. As a result of such displacement of the at least one component, in this instance the printed circuit board 32, the mechanical and electrical connecting elements 34 of the transmission display module 18 are thereby sufficiently displaced or moved so as to be properly aligned with the corresponding female of male connector(s) 38 of the transmission control module 16 and achieve a secure and reliable electrical connection therewith. In order to facilitate movement of the printed circuit board 32 with respect to a remainder of the transmission display module 18, e.g., along either, or both, of the lateral orthogonal axes B and C, the printed circuit board 32 is captively but "floatingly" mounted with respect to a remainder of the transmission display module 18. That is, the printed circuit board 32 is secured to the transmission display module 18 while still being able to be displaced or moved over a limited range of movement within the common plane, with the limited range of movement generally being greater than the cumulative total tolerances of the transmission control module 16 and the transmission display module 18.

Figure 3:
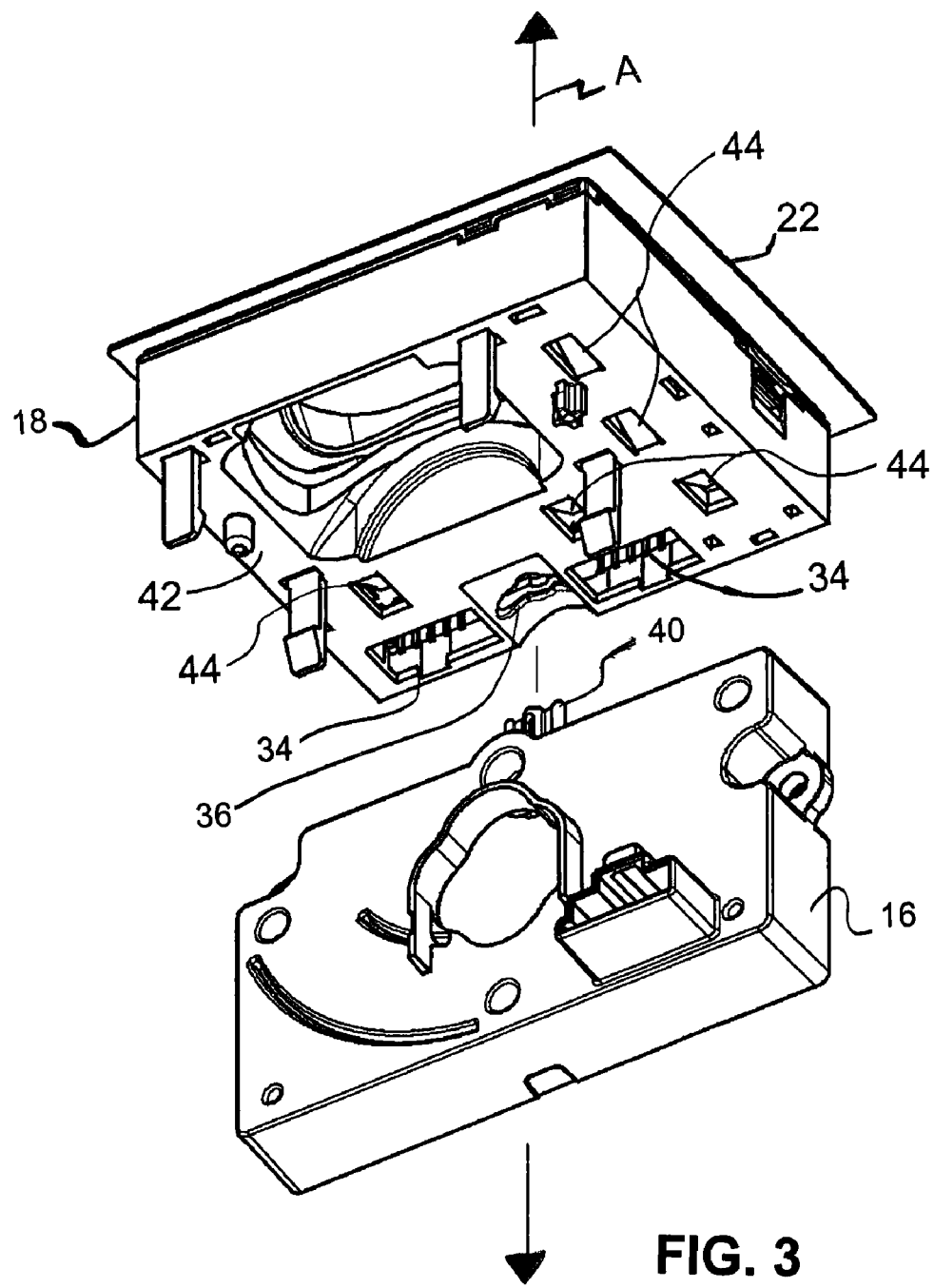
FIG. 3 is a lower assembly isometric view of the control module mechanically and electrically interconnected with a display module.
Figure 6B:
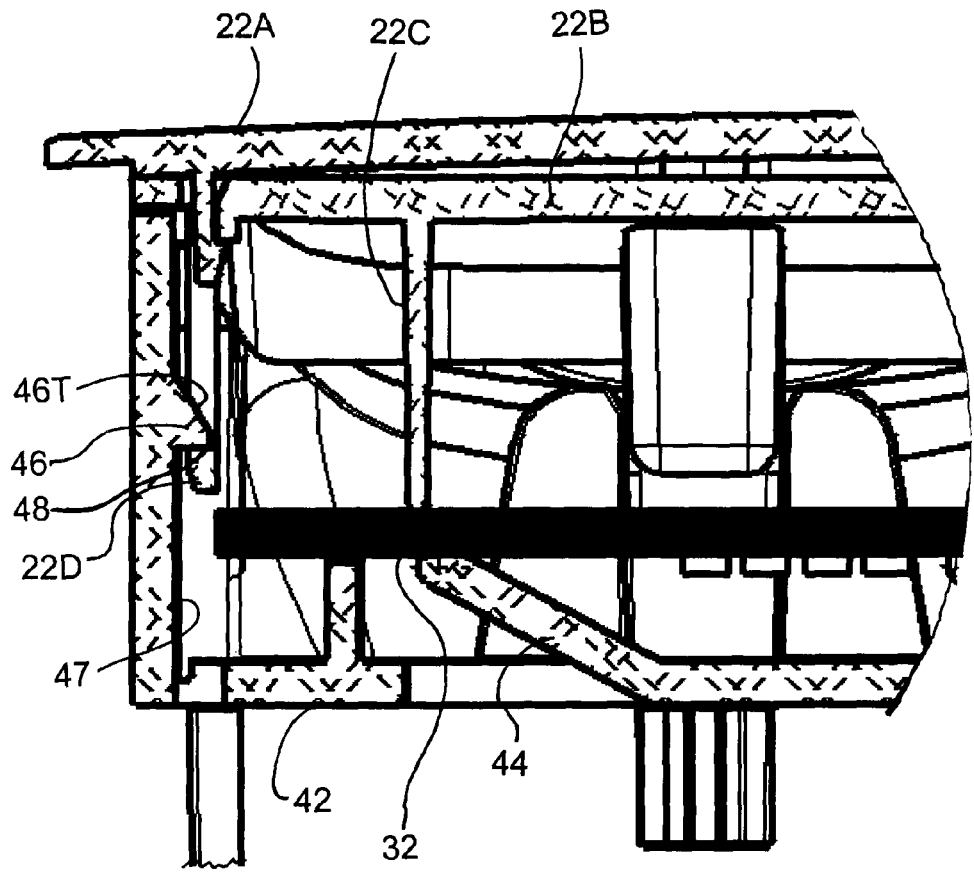
FIG. 6B is an exploded view of FIG. 6A showing the captive retention of the circuit board within the transmission display module.
Figure 6C:
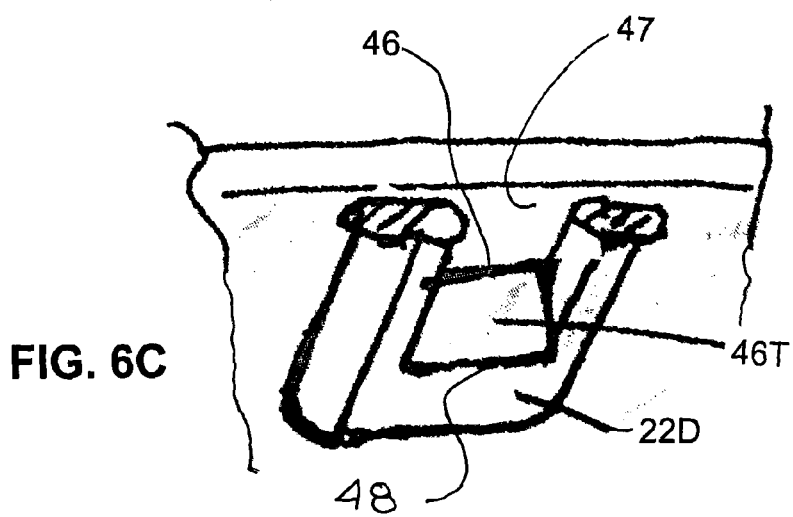
FIG. 6C is a diagrammatic isometric view showing engagement between a retaining clip and a respective "U" shaped element.

With reference now to FIGS. 1, 3, 6, 6A, 6B and 6C, the captively but "floatingly" mounting of the printed circuit board 32 within the transmission display module 18 will now be briefly discussed. The side walls 47 of the module and one or more lateral retainers 41 define an interior space of the transmission display module 18 for accommodating the circuit board 32. As shown in FIGS. 3, 6 and 6A, a base surface 42 of the transmission display module 18 has a plurality of spring elements 44 which project at an angle relative to the base surface 42 and are arranged for biasing an undersurface of the printed circuit board 32 away from the base surface 42.

As shown in FIGS. 1, 4, 6A, 6B, and 6C for example, a plurality of retaining clips 46 are formed on along a perimeter of an inwardly facing surfaces of the side wall 47 of the transmission display module 18. Each one of these retaining clips 46 has an inwardly directed tapering surface 46T which is located for engaging with a respective "U" shaped element 22D which is integral with and extends from the underside of the display panel cover 22 (see FIG. 6C for example). In addition, the underside of the display panel cover 22 also has a plurality of spaced apart protrusions/splines 22C that are integral with and extend generally normal to the underside of the display panel cover 22. A free end of each plurality of protrusions/splines 22C is preferably rounded and engages with an upper surface of the circuit board 32 so as to uniformly space the circuit board 32 away from the display panel cover 22.

Due to this arrangement, once the circuit board 32 is accommodated within the interior space of the transmission display module 18, the display panel cover 22 is then moved along the connection axis A toward the base surface 42 to close the transmission display module 18. During such movement, each respective "U" shaped element 22D eventually engages with and rides along the tapered surface 46T of the respective retaining clip 46 and is gradually biased inwardly until the respective "U" shaped element 22D finally extends a distance slightly past and "clears" the respective retaining clip 46. At that instance, the respective "U" shaped element 22D instantly moves slightly outwardly and thus captively engages with the stop surface 48 of the retaining clip 46. Such engagement generally permanently retains the display panel cover 22 in engagement with the transmission display module 18. Following such engagement between the display panel cover 22 and the transmission display module 18, the spring elements 44 are compressed somewhat so as to bias the printed circuit board 32 against the plurality of spaced apart protrusions/splines 22C whereby the printed circuit board 32 is sandwiched therebetween. In addition, the side walls 47 and the one or more lateral retainers 41 limit lateral movement of the printed circuit board 32 along the orthogonal axes B and C. That is, the protrusions/splines 22C, the spring elements 44, the lateral retainers 41 and the side walls 47 of transmission display module 18 all cooperate with one another to captively retain the printed circuit board 32 within the transmission display module 18 while still permitting the printed circuit board 32 to have a limited range of lateral movement. It is to be appreciated that the protrusions/splines 22C are located so that the engagement of the protrusions/splines 22C with upper surface of the printed circuit board 32 does not negatively impact any operation or function of the printed circuit board 32.

As shown in this embodiment, the spring elements 44 are formed integral with the base surface 42, but it is to be appreciated that the spring elements could, if so desired, be separate spring elements which are located between the base surface 42 and the printed circuit board 32.

If desired, the printed circuit board 32 may also include one or more alignment slot(s) 50 (see FIG. 4) and the transmission display module 18 may include a corresponding mating alignment element(s) 52, each arranged to mate with one another and prevent excessive skewing or rotation of the printed circuit board 32 relative to the transmission display module 18 about the connection axis A. As generally shown in FIG. 4 of the drawings, all of the connectors 34 of the circuit board 32 are all aligned with one another substantially along a vertical plane (not labeled), extending parallel (or possibly coincident) with the connection axis A, while the single hole 36 can be slightly offset with respect to that vertical plane. In addition, as generally shown in FIG. 4 of the drawings, all of the connectors 38 of the transmission control module 16 are also all aligned with one another substantially along a vertical plane (not labeled), extending parallel (or possibly coincident) with the connection axis A, while the alignment pin 40 can be slightly offset with respect to that vertical plane. Preferably, both the alignment pin 40 and the mating hole 36 of the circuit board 32 have a sufficient width along their respective vertical planes (not labeled) so as to facilitate aligning both of those vertical planes substantially coincident with one another, as shown in FIG. 4, and achieve the desired mating connection of all of the connectors 34 with all of the associated mating connectors 38 during the engagement movement of those components along the connection axis A.

According to the depicted embodiment, the transmission display module 18 supports the printed circuit board 32, but it is to be appreciated that orientation could be reversed. As shown, the printed circuit board 32 includes at least one male or female electrical connector 34 (i.e., a plurality of male connectors 34 are generally shown in FIG. 5) extending along the connection axis A for mating with a corresponding female or male connector 38 (i.e., a plurality of female connectors 38 are generally shown in FIG. 5), and a single alignment hole 36 extends completely through the circuit board 32. As noted above, the circuit board 32 is floatingly mounted to a bottom surface of the transmission display module 18 so as to allow a limited degree of movement of the circuit board 32 relative to the transmission display module 18 along one or both lateral axes B and/or C to allow the connectors 34 of the transmission display module 18 to be properly aligned and mated with corresponding mating connectors 38 of the transmission control module 16 and thereby compensate for any misalignment between the connectors 34 of the transmission display module 18 and the corresponding connectors 38 of the transmission control module 16. It is to be appreciated that while the circuit board 32 and the connectors 34 are floatingly supported by the transmission display module 18, the corresponding mating connectors 38 of the transmission control module 16 are typically fixedly secured to the transmission control module 16.

The circuit board 32 further includes conventional wiring and/or contacts (not labeled) as necessary to connect or couple the associated connecting pins or sockets of the connectors 34 to other associated circuitry in the transmission display module 18, thereby fully completing the electrical and electronic connections between the transmission control module 16 and the transmission display module 18. In this respect, it will be noted that the transmission display module 18 will also include such conventional wiring and/or contacts as necessary to connect the display panel control outputs of the printed circuit board 32 to corresponding inputs of the display panel 24.

It will be appreciated that the wiring and/or contacts between the circuit board 32 and the other circuitry in the transmission display module 18 will be dependent upon the specific circuitry and mechanical layout concerned and must accommodate the necessary degree of displacement and/or movement between the circuit board 32 and the other elements of the transmission display module 18. For example, a top surface of the circuit board 32 may be mounted to a bottom surface of the display panel 24 and, in this embodiment, the connections between the circuit board 32 and the display panel 24 may take the form of mating electrical contacts. In other instances, the connections between the circuit board 32 and the display panel 24 may take the form of, for example, a wiring harness, a flexible printed circuit board, etc. Various forms of such connections will be apparent and well known to those of ordinary skill in the relevant arts, particularly since all such connections will be located within the transmission display module 18, rather than between the interface between the transmission display module 18 and the transmission control module 16, and thus are not required to accommodate the degree of movement required for connections between the transmission control module 16 and the transmission display module 18

Referring now to the transmission control module 16 as shown in FIGS. 1, 2, 2A and 3, as shown therein the transmission control module 16 includes connectors 38 positioned and oriented to mate with the mating connectors 34 of the transmission display module 18, and an alignment pin 40 which is aligned and oriented so as to mate with corresponding alignment hole 36 provided in the circuit board 32. According to the present invention, when the transmission display module 18 and the transmission control module 16 are initially brought into mechanical engagement with one another, by relative movement of those two modules 16, 18 along the connection axis A, the alignment pin 40 of the transmission control module 16 first engages and interacts with the corresponding alignment hole 36 of the circuit board 32 of the transmission display module 18. As a result of such interaction between the alignment pin(s) 40 and the corresponding alignment hole(s) 36, the circuit board 32 is suitably displaced and/or moved along one or both lateral orthogonal axes B and/or C so that the connectors 34, 38 are eventually substantially properly aligned with one another.

Upon further relative movement of the modules 16, 18 along the connection axis A toward one another, the connectors 34 of the circuit board 32 are then brought into electrical contact and engagement with the corresponding connectors 38 of the transmission control module 16. As a result of such relative movement of the modules 16, 18 with respect to one another along the connection axis A, the transmission display module 18 and the transmission control module 16 are automatically, consistently and precisely brought into electrical connection with one another without causing any damage to the connectors 34, 38 and/or the circuit board 32. To assist with achieving proper alignment, it will be appreciated that the mating alignment elements of the transmission control module 16 and the transmission display module 18, e.g, the pin(s) 40 and hole(s) 36, may each be tapered or otherwise shaped and/or contoured to bring about the desired alignment between the mating elements despite the anticipated degree of initial misalignment between the connectors 34 and the connectors 38, and thereby to guide the circuit board 32 and the connectors 34 into the desired final alignment and engagement with the connectors 38 of the transmission control module 16. For example, the alignment pin(s) 40 of the transmission control module 16 may gradually taper and the corresponding hole(s) 36 of the circuit board 32 may have a corresponding gradual taper.

With respect to the engagement between the pin(s) 40 and hole(s) 36, the important aspect is that the engagement between those two alignment features must accurately and precise align the connectors 34 of the circuit board 32 with the connectors 38 of the transmission control module 16, prior to the connectors 34, 38 being moved along the connection axis A and commencing their engagement with one another. Accordingly the pin(s) 40 must protrude or extend a sufficient distance past a leading end of the transmission control module 16 and/or be of a sufficient number and/or have a non-circular transverse cross-sectional shape with a sufficient width along a vertical plane, coincident with the connection axis A, so that as the pin(s) 40 engages with the hole(s) 36, such engagement achieves a proper and a precise alignment of the connectors 34 and with each one of the respective connectors 38 before the connectors 34, 38 commencing engagement with one another by further movement along the connection axis A.

Since certain changes may be made in the above described connector for electrical and mechanical interconnection of adjacent modules without departing from the spirit and scope of the invention herein involved, it is intended that all of the subject matter of the above description or shown in the accompanying drawings shall be interpreted merely as examples illustrating the inventive concept herein and shall not be construed as limiting the invention.

Wherefore, we claim:

1. A connector assembly for electrical and mechanical interconnection of first and second adjacent modules with one another,
    the first module comprising:
        at least one first electrical connector mounted therein and aligned along a connection axis between the first and second modules, and
        at least one alignment pin aligned along the connection axis between the first and second modules, and
    the second module comprising:
        a circuit board floatingly connected to the second module for mating with the first module, the circuit board being displaceable along at least one orthogonal axis, orthogonal to the connection axis, and the circuit board comprising at least one alignment hole aligned for engagement with the at least one alignment pin of the first module, and
        at least one second electrical connector aligned for engagement with the at least one first electrical connector of the first module so that, when the first and second modules are brought into mechanical connection with each other by relative movement along the connection axis, the at least one alignment pin of the first module engages with the at least one alignment hole of the second module and displaces the printed circuit board of the second module orthogonally to the connection axis for facilitating alignment and electrical connection of the at least one second electrical connector of the second module with the at least one first electrical connector of the first module.

2. The connector assembly according to claim 1, wherein:
    the first module is a transmission control module, and
    the second module is a transmission display module.

3. The connector assembly according to claim 2, wherein the transmission display module further includes a display panel connected to the circuit board and responsive to display control outputs of the circuit board to programmably display information relating to operation of a transmission, including at least one of a transmission shift pattern, a current transmission gear and a current transmission gear ratio.

4. The connector assembly according to claim 1, wherein the circuit board is sandwiched between a plurality of splines and spring elements and is laterally restrained by side walls of the second module.

5. The connector assembly according to claim 1, wherein the at least one alignment pin is offset with respect to the at least one first electrical connector, and
    the at least one alignment hole is offset with respect to the at least one second electrical connector.

6. A connector assembly for interconnection of first and second adjacent modules with one another,
    the first module comprising:
        a plurality of first electrical connectors mounted therein and aligned along a connection axis between the first and second modules, and
        an elongate alignment pin extending along the connection axis between the first and second modules, and
    the second module comprising:
        a circuit board floatingly retained by the second module for mating with the first module, the circuit board being captively retained and being displaceable along at least one orthogonal axis, orthogonal to the connection axis, and the circuit board comprising an elongate alignment hole aligned for engagement with the elongate alignment pin of the first module, and
        a plurality of second electrical connectors aligned for engagement with a respective one of the plurality of first electrical connectors of the first module so that, when the first and second modules are brought into mechanical connection with one another by relative movement along the connection axis, the elongate alignment pin of the first module engages with the elongate alignment hole of the second module and displaces the printed circuit board of the second module orthogonally to the connection axis for facilitating alignment and electrical connection of the plurality of second electrical connectors of the second module with the plurality of first electrical connectors of the first module.

7. The connector assembly according to claim 6, wherein:
    the first module is a transmission control module, and
    the second module is a transmission display module.

8. The connector assembly according to claim 7, wherein the transmission display module further includes a display panel connected to the circuit board and responsive to display control outputs of the circuit board to programmably display information relating to operation of a transmission, including at least one of a transmission shift pattern, a current transmission gear and a current transmission gear ratio.

9. The connector assembly according to claim 6, wherein the circuit board is sandwiched between a plurality of splines and spring elements and is laterally restrained by side walls of the second module.

10. The connector assembly according to claim 6, wherein the elongate alignment pin is offset with respect to the plurality of first electrical connectors, and
    the elongate alignment hole is offset with respect to the plurality of second electrical connectors.

* * * * *